United States Patent [19]

Hanson

[11] Patent Number: 4,565,257
[45] Date of Patent: Jan. 21, 1986

[54] MULTI-MODE STEERING SYSTEM

[75] Inventor: Charles B. Hanson, Burlington, Iowa

[73] Assignee: J. I. Case Company, Racine, Wis.

[21] Appl. No.: 578,091

[22] Filed: Feb. 8, 1984

[51] Int. Cl.$^4$ .............................................. B62D 5/06
[52] U.S. Cl. ................................... 180/135; 180/136; 280/442
[58] Field of Search ................. 180/79, 134, 135, 6.2, 180/6.24, 6.26, 6.3, 6.44, 136; 280/442

[56] References Cited

U.S. PATENT DOCUMENTS

| | | | |
|---|---|---|---|
| 3,380,547 | 12/1964 | Granryd | 180/135 |
| 3,515,235 | 6/1970 | Kamner | 180/135 X |
| 3,527,315 | 5/1968 | Hampton | 180/79.1 |
| 3,750,834 | 8/1973 | Luft | 180/135 X |
| 3,771,241 | 11/1973 | Lindell et al. | 37/135 X |
| 3,783,963 | 1/1974 | Erwin | 180/134 X |
| 3,903,983 | 12/1972 | Yeske | 180/79.2 |
| 3,991,847 | 11/1976 | Unruh | 180/135 |
| 4,042,053 | 8/1975 | Sieren et al. | 180/135 |
| 4,175,638 | 12/1978 | Christensen | 180/79.1 |
| 4,263,979 | 11/1978 | Sturgill | 180/79.1 |
| 4,315,555 | 10/1979 | Schritt | 180/79.1 |

FOREIGN PATENT DOCUMENTS

| | | | |
|---|---|---|---|
| 650730 | 10/1962 | Canada | 180/134 |
| 765083 | 9/1980 | U.S.S.R. | 180/134 |

Primary Examiner—William R. Cline
Assistant Examiner—Peggy A. Neils
Attorney, Agent, or Firm—Dressler, Goldsmith, Shore, Sutker & Milnamow, Ltd.

[57] ABSTRACT

A material handling implement is disclosed having a multi-mode steering system embodying the principles of the present invention. The implement includes an articulable frame having front and rear frame portions which can be selectively articulated by an articulating hydraulic motor operatively connected thereto. The implement further includes steerable front wheel assemblies mounted on the front frame portion which can be selectively steered by operation of a steering hydraulic motor. An electrical control network is provided whereby the operator of the implement may selectively choose either conventional front wheel steering or articulated steering only. Additionally, this system includes first and second rotational sensors respectively associated with the articulable frame and one of the steerable front wheels. The sensors are electrically joined with the control network of the system whereby the operator may further select combined or coordinated front wheel and articulated steering. By this arrangement, the mode of steering control for the implement can be readily selected as best suits the work operations being performed, thus greatly enhancing the versatility and the efficiency of the implement.

12 Claims, 8 Drawing Figures

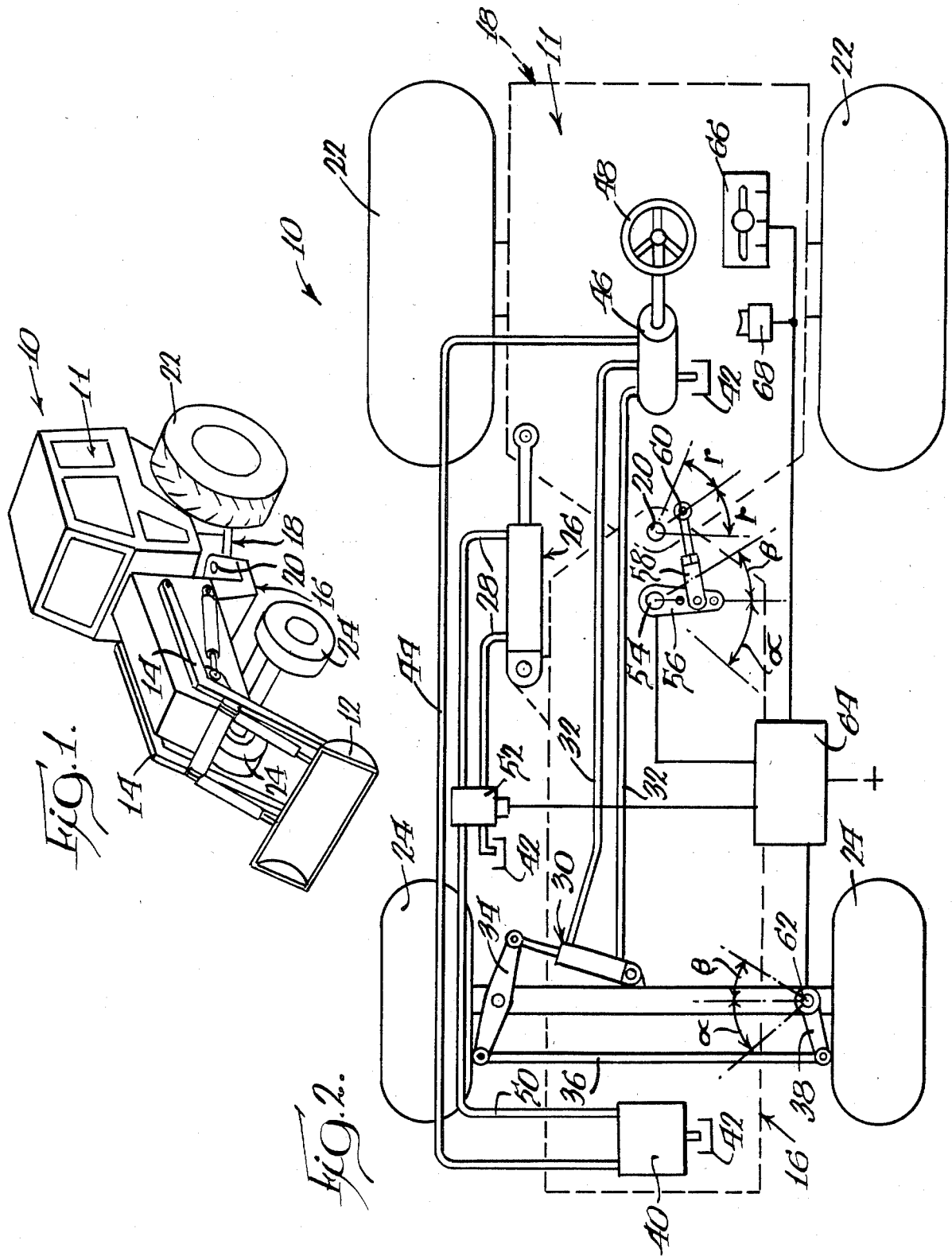

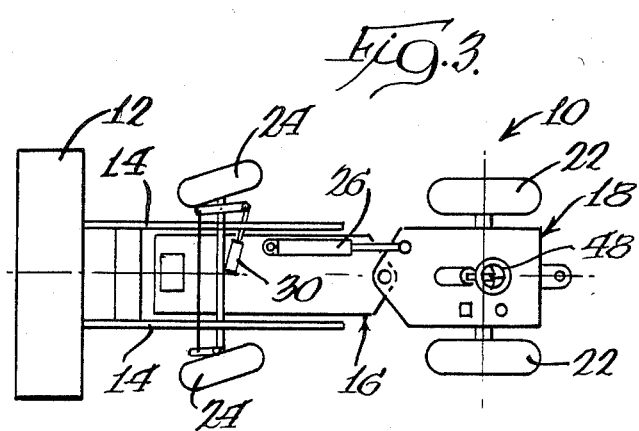
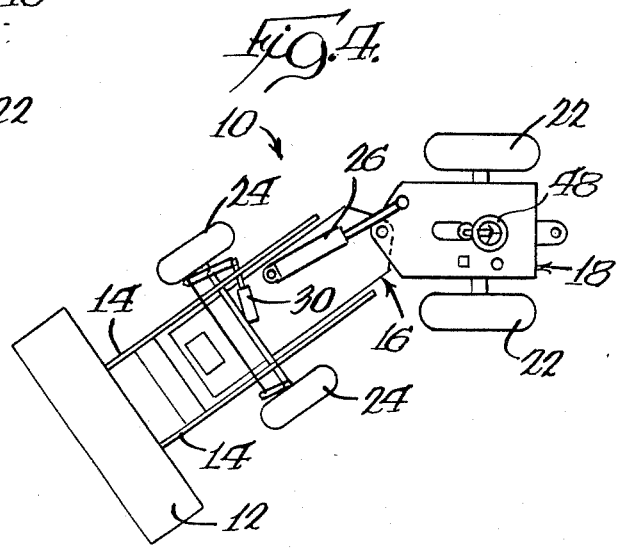
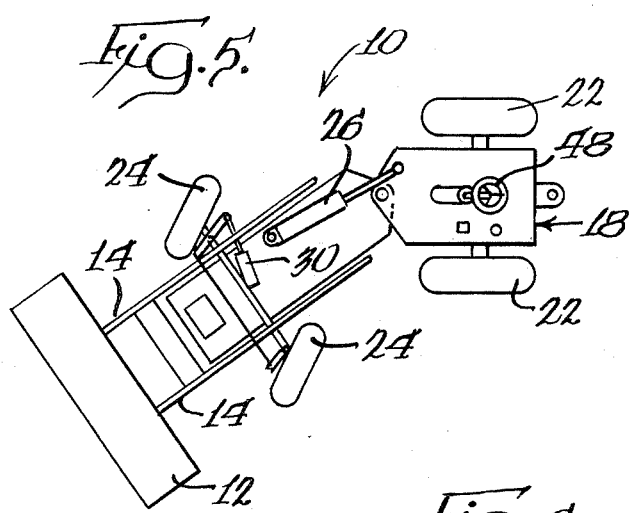
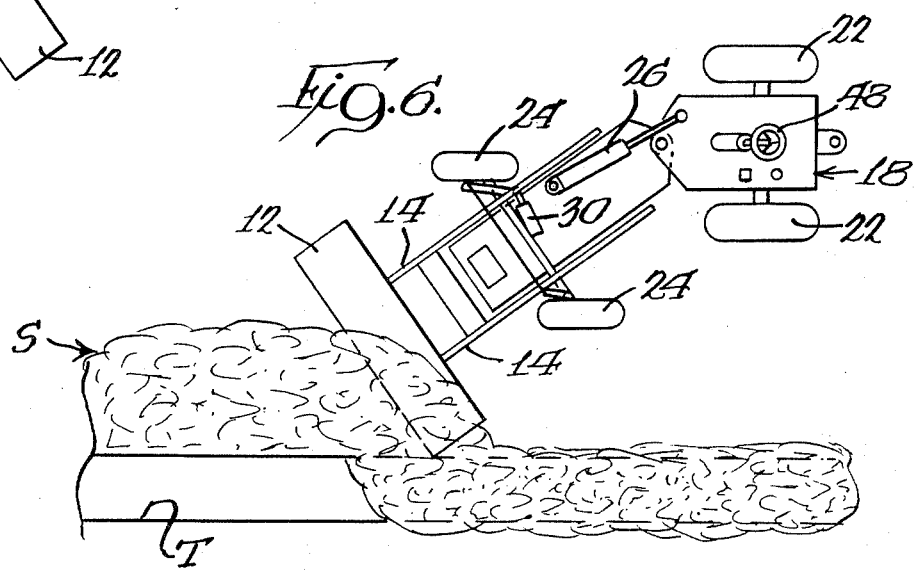

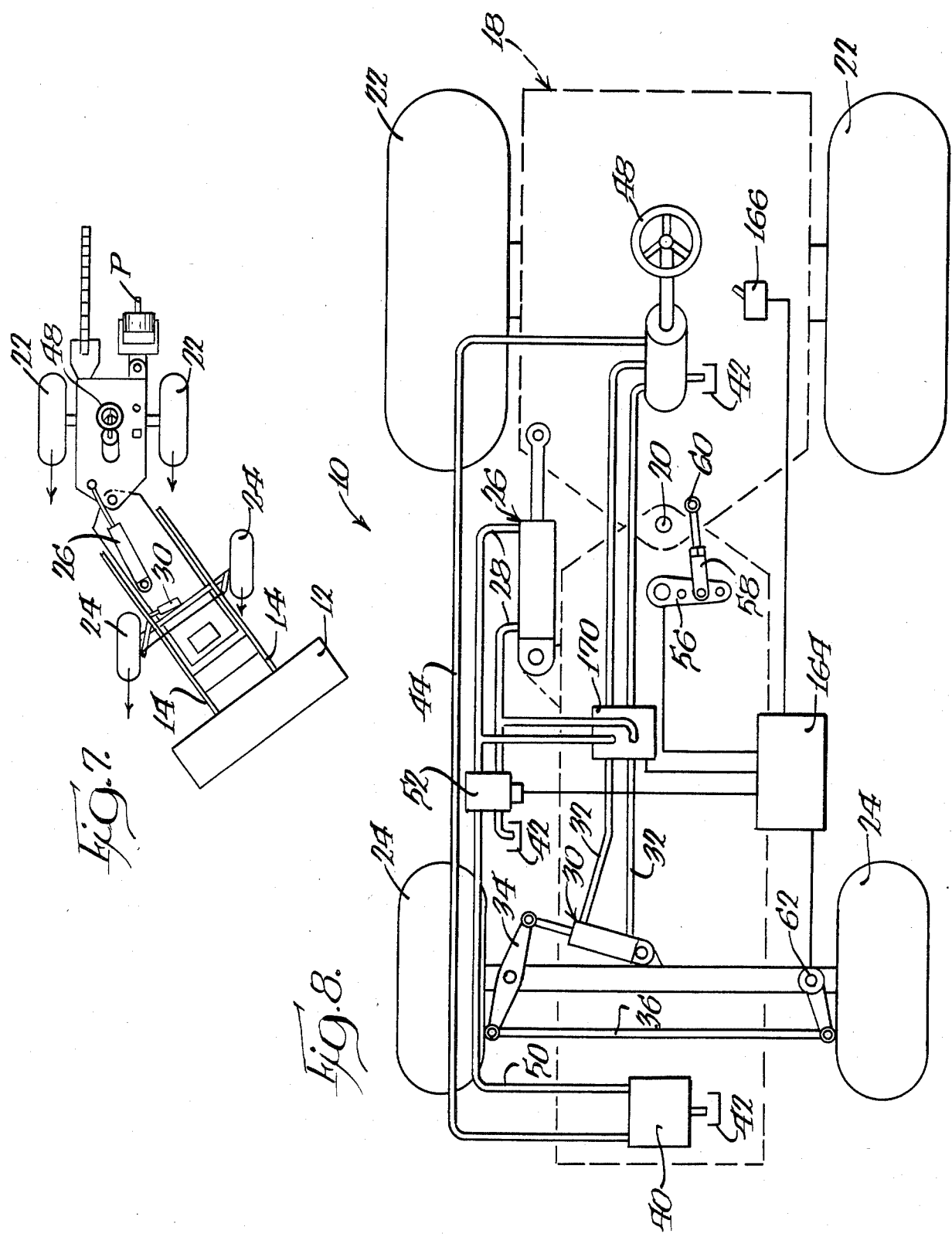

MULTI-MODE STEERING SYSTEM

TECHNICAL FIELD

The present invention relates generally to steering systems for material handling implements and the like, and more particularly to a steering system configured to selectively provide conventional, articulated, and coordinated conventional/articulated steering of an implement.

BACKGROUND OF THE INVENTION

A conventional steering system for a material handling implement, such as a tractor or the like, typically includes a pair of steerable front wheel assemblies mounted on respective opposite sides of the rigid frame of the implement. Steering is effected from the operator's control area, with this type of arrangement providing the desired steering control under many operating conditions. Experience has shown that this conventional steering assembly desirably provides stability when operating the implement at relatively high speeds, as well as when the implement is traveling over uneven terrain. However, this type of steering arrangement sometimes lacks desired control, such as during operation at relatively slow speeds on terrain with marginal traction. Additionally, steering control can be lost when the front-end loader bucket of the implement is operated such that the steerable front wheels are raised off the ground.

Because of the disadvantages associated with conventional steering under some operating conditions, many material handling implements are equipped with so-called articulated steering, wherein steering is effected by selective articulation of front and rear portions of the frame of the implement. This type of steering can be very effective on terrain which offers minimal traction, and permits the implement to be "rocked" (i.e., articulated back-and-forth) should the implement become stuck in mud or the like. Additionally, articulated steering can still be effected should the front wheels of the implement be raised off the ground such as during operation of its front-end loader.

As will be recognized, greatly enhanced versatility can be obtained by providing an implement with both articulated and conventional steering systems. Additionally, further versatility is achieved if both conventional and articulated steering can be selectively coordinated. To this end, the present steering system is configured to provide multiple modes of steering action, including conventional, articulated, and selective coordination of both.

SUMMARY OF THE INVENTION

A material handling implement having a multi-mode steering system embodying the principles of the present invention is provided with greatly enhanced versatility for very efficient performance of material handling operations. By the present system, steering can be readily effected in either a conventional or articulated manner, depending upon operational requirements and field conditions. Furthermore, the present system selectively permits coordinated and simultaneous conventional and articulated steering for greatly enhanced manuverability of the implement. Because the conventional and articulated steering mechanisms can be independently operated if desired, so-called "semi-crab" steering can also be effected wherein the implement is articulated and thereafter held at an angle, with the steerable front wheels of the implement then employed for guiding its movement.

The material handling implement embodying the principles of the present multi-mode steering system includes a steerable, articulable frame having a front frame portion and a rear frame portion, with articulating pivot means pivotally connecting the front and rear frame portions for angular movement with respect to each other. The implement further includes a pair of rear wheels mounted on respective opposite sides of the rear frame portion, and a pair of steerable front wheels mounted on respective opposite sides of the front frame portion. Each of the steerable front wheels is mounted for steering movement about a respective generally vertical axis.

In the illustrated embodiment, the implement is provided with so-called Ackerman-type steering, and includes a steering linkage which operatively connects the front wheels for concurrent steering movement. As will be recognized by those familiar with the art, this type of steering operates such that each of the front wheels is moved through a different angle from a straight-ahead position, thus providing smooth tracking of the wheels during turning.

Articulation of the implement frame is effected by a first articulating hydraulic motor operatively connected to and extending between the front and rear frame portions of the implement. The articulating motor preferably comprises a double-acting fluid ram, which is connected with the frame portion such that selective fluid pressurization thereof articulates the implement frame.

Conventional steering of the front wheels is effected by a second steering hydraulic motor operatively connected with the steering linkage of the implement. This motor also preferably comprises a double-acting fluid ram, with selective fluid pressurization thereof effecting steering movement of the front wheels.

In order to provide coordinated or combined conventional and articulated steering, the present steering system includes a first rotary sensor operatively connected with the front and rear frame portions for producing a first signal which corresponds to the relative angular position of the frame portions. A second rotary sensor is further provided in operative connection with the steering linkage of the implement, with the second sensor providing a second signal corresponding to the angular position of the steerable front wheels. Notably, the second rotary sensor is operatively connected with the steering linkage at one of the front wheels, and thus the second signal differs in value attendant to right-hand and left-hand steering movement of that one of the front wheels through differing first and second angles form a straight-ahead disposition.

The steering system further includes an electrical steering control network which is operatively connected with the first and second rotary sensors. The control network includes an operator-positionable mode switch mounted in the control area of the implement whereby the signals produced by the rotary sensors can be integrated for selectively coordinating operation of the first articulating motor and the second steering motor. As noted above, the selective manner in which the control network can be operated provides a plurality of modes of steering control for the implement.

A supply of pressurized hydraulic fluid for operation of the first articulating motor and the second steering motor is provided by at least one hydraulic fluid pump, typically driven by the internal combustion engine of the implement. Control of pressurized fluid flow to the first articulating motor is provided via an electrically-operable articulating valve which is part of the steering control network of the system. Control of pressurized fluid to the second steering motor is provided by a conventional steering "hand pump", which supplies pressurized fluid to the steering motor in response to steering input of the implement operator through the steering wheel of the hand pump.

Appropriate positioning of the operator's mode switch joins the first and second rotary sensors in operative association with each other such that steering of the front wheels effects articulation of the frame (by operation of the articulating valve) so that the frame is articulated for effecting steering in the same direction as the direction of steering effected by movement of the front wheels. Since some operations require articulated steering only, the control network of the present steering system includes means for effecting articulation only. In one disclosed embodiment of the present invention, an articulating switch is provided which is operable from the implement control area for selectively operating the articulating valve independently of the front wheels, thus effecting articulation only. In another embodiment, a hydraulic selector valve is hydraulically joined to the first and second hydraulic motors of the system and with the steering input hand pump. The selector valve is operatively connected with the control network of the system whereby the operator's mode switch can be selectively positioned to operate the hydraulic selector valve to join the steering input hand pump with either one of the first steering and second articulating hydraulic motors.

As noted, each steerable front wheel of the present implement moves through differing first and second angles from a straight-ahead position attendant to steering in right-hand and left-hand directions. In order to facilitate coordinated and corresponding steering articulation of the implement frame, the first rotary sensor of the system is operatively connected with the front and rear frame portions such that the first signal produced thereby differs in value attendant to the same degree of articulation of the frame portions in opposite directions from a straight-ahead orientation. By this construction, the first and second signals produced by the rotary sensors can be integrated for selective coordinated conventional and articulated steering.

Numerous other features and advantages of the present invention will become readily apparent from the following detailed description, accompanying drawings, and the apended claims.

BRIEF DESCRIPTION OF THE DRAWINGS

FIG. 1 is a perspective view of a material handling implement having a multi-mode steering system embodying the principles of the present invention;

FIG. 2 is a diagramatic view illustrating the present steering system and its operative association with the material handling implement shown in FIG. 1;

FIGS. 3 to 7 illustrate the various modes of steering operation of the implement shown in FIG. 1 as provided by the present steering system; and FIG. 8 is a diagramatic view similar to FIG. 2 illustrating a modified embodiment of the present multi-mode steering system.

DETAILED DESCRIPTION

While the present invention is susceptible of embodiment in various forms, there is shown in the drawings and will hereinafter be described alternate embodiments of the present invention, with the understanding that the present disclosure is to be considered as an exemplification of the invention, and is not intended to limit the invention to the specific embodiments illustrated.

Referring first to FIG. 1, therein is illustrated a material handling implement 10 having a multi-mode steering system embodying the principles of the present invention. It will be understood that implement 10, which is shown as a tractor equipped with a front-end loader, is intended as illustrative of the type of equipment for which the present steering system is suited, and that the present system is readily adaptable to other types of implements having articulable frames and steerable front or rear wheel assemblies.

The operator of implement 10 is positioned at control area 11 for performing various material handling operations. For purposes of illustration, implement 10 is shown as including a front-end loader bucket 12 supported for selective movement with respect to the implement by a pair of support arms 14. As will be recognized, an implement such as tractor 10 may be further equipped with rear-mounted attachments, such as a trencher or backhoe.

With further reference to the drawings, implement 10 includes a steerable, articulable frame including a front frame portion 16 and a rear frame portion 18. Front and rear frame portions 16 and 18 are pivotally connected together for angular steering movement with respect to each other by articulating pivot 20 which defines a generally vertically oriented articulating pivot axis.

In accordance with the present invention, implement 10 further includes a pair of rear wheels 22 mounted on respective opposite sides of rear frame portion 18, and a pair of steerable front wheels 24 mounted on respective opposite sides of the front frame portion 16. As will be recognized by those familiar with the art, steerable wheels 24 provide implement 10 with Ackerman-type steering control, with each of steerable wheels 24 being mounted for steering movement about a respective generally verticle axis. While implement 10 has been illlustrated as including steerable wheel assemblies mounted on front frame portion 16, with rear wheels 22 typically being driven, it will be recognized that the present steering system is readily adaptable for an implement having an articulable frame with steerable wheel assemblies mounted on a rear frame portion, and is further adaptable for either two-wheel or four-wheel drive systems.

With particular reference to FIG. 2, articulation of the frame of implement 10 is effected by means of a first articulating hydraulic motor 26 which extends between and is respectively connected to the front and rear frame portions 16 and 18. Articulating motor 26 preferably comprises a double-acting fluid ram having respective ends thereof respectively pivotally connected to the front and rear frame portions. Hydraulic fluid conduits 28 accommodate the flow of hydraulic fluid to and from articulating motor 26.

Steering movement of front wheels 24 is effected by a second steering hydraulic motor 30, which also preferably comprises a double-acting fluid ram. Conduits 32 accommodate the flow of hydraulic fluid to and from steering motor 30, as will be further described. Steering motor 30 is operatively connected with a steering linkage which operatively connects the steerable front wheels 24 to each other for steering movement in unison. The steering linkage includes a link 34 pivotally mounted on the front frame portion 16, with hydraulic motor 30 pivotally connected to one end of the link 34. The other end of link 34 is pivotally connected to a tie rod 36 which extends generally transversely between the front wheels 24. Tie rod 36 is in turn pivotally connected to a link 38 which imparts steering movement to the left-hand one of wheels 24 (referring to the orientation of the drawings).

As indicated in FIG. 2, each front wheel 24 is movable from a straight-ahead disposition through differing first and second angles attendant to steering in left-hand and right-hand directions. Steering is effected in this manner to provide smooth tracking during turning since the wheels 24 are each moving about a different radius of curvature. Thus, during right-hand steering, the left-hand one of wheels 24 is movable through an angle "alpha", while during left-hand steering that one of the wheels 24 is movable through angle "beta". The movement of the right-hand one of wheels 24 is in converse angular relationship, and is thus movable through an angle "beta" and an angle "alpha" attendant to right-hand and left-hand steering, respectively.

A supply of pressurized hydraulic fluid for operation of articulating motor 26 and steering motor 30 is provided by at least one hydraulic pump 40 which draws hydraulic fluid from a fluid reservoir 42 of the implement 10. Hydraulic pump 40 is typically powered by the internal combustion engine of implement 10, and is typically adapted to provide a continuous supply of pressurized hydraulic fluid during operation of the implement.

Pressurized hydraulic fluid for effecting selective operation of steering hydraulic motor 30 is provided via a hydraulic fluid conduit 44 which runs from hydraulic pump 40 to a so-called steering hand pump 46. Steering hand pump 46 may be of conventional configuration, typically including a steering wheel 48 at the control area 11 for steering input by the operator of implement 10. Selective control of steering input hand pump 46 provides selective direction of pressurized hydraulic fluid from conduit 44 to the steering hydraulic motor 30 via conduits 32, thus effecting selective movement of steerable front wheels 24.

Pressurized hydraulic fluid for operation of articulating motor 26 is provided from hydraulic pump 40 via hydraulic fluid conduit 50. Selective fluid pressurization of articulating motor 26 is provided by an electrically operable, articulating spool valve 52 which joins fluid supply conduit 50 with conduits 28 to articulating motor 26. Notably, articulating valve 52 forms part of the electrical network of the present steering system which provides the implement 10 with multiple modes of steering control.

In order to effect combined or coordinated conventional and articulated steering of implement 10, the present steering system includes a first articulating rotary sensor 54 operatively connected with articulable front and rear frame portions 16 and 18. First rotary sensor 54 may be in the nature of a potentiometer, and is adapted to provide a first electrical signal reflective of the relative angular position of front and rear frame portions 16 and 18. To this end, first sensor 54 is rotatably operated by an adjustment link 56 operatively connected thereto, with link 56 in turn pivotally connected to an interconnecting link 58, preferably of adjustable length. Link 58 is in turn pivotally connected to rear frame portion 18 at 60 at a point spaced from the articulating axis of the frame defined by articulating pivot 20.

While the rotary sensor 54 could be mounted directly on the articulating pivot 20, the arrangement illustrated is preferred since the amount of frame angular articulation can be greater than the amount of angular front wheel steering movement. Additionally, the arrangement illustrated is particularly desirable since sensor 54 is preferably moved through different angles attendant to equal angular articulation of the frame portions 16 and 18 in opposite directions from a straight-ahead orientation. This is best illustrated in FIG. 2 wherein angles "gamma" illustrate equal angular articulation of the frame portions in opposite directions from a straight-ahead disposition, with rotary sensor 54 being moved through differing angles "alpha" and "beta" corresponding to angular left-hand and right-hand steering movement of the left-hand steerable front wheel 24. The preferred adjustable nature of the illustrated linkage facilitates convenient alteration of the degree of frame articulation which is effected during the coordinated conventional/articulated steering of the implement, since the degree of articulation corresponding to a given value of the first signal provided by sensor 54 can be selectively varied.

In order to coordinate the articulated steering of implement 10 with steering movement of front wheels 24, the present steering system further includes a second rotary sensor 62 which is operatively connected with the steering linkage of the steerable front wheels, preferably at the respective vertical steering axis of one of the front wheels. Accordingly, second sensor 62 is mounted in operative association with the king pin of the left-hand steerable front wheel 24 about which that wheel 24 moves. Second rotary sensor 62 is adapted to provide a second electrical signal which corresponds to the angular steering dispostion of the left-hand steerable wheel 24.

The present steering system includes an electrical control network for integrating the first and second electrical signals produced by first and second rotary sensors 54 and 62 for providing selective coordinated conventional and articulated steering. The control network includes a control module 64 including suitable comparator circuitry, with the module 64 being electrically joined to the rotary sensors 54 and 62, and the articulating valve 52. The control network further includes a multi-position mode switch 66 mounted in the operator's control area 11, and may further include a rocker-type switch 68 or the like for effecting articulation of front and rear frame portions 16 and 18 independently of steering movement of front wheels 24 by selective operation of articulating valve 52.

The various modes of steering control for implement 10 provided by the present steering system will now be described. With reference first to FIG. 3, therein is illustrated implement 10 with conventional, Ackerman steering being effected by steerable front wheels 24. For operation in this manner, mode switch 66 is positioned by the implement operator so that control module 64 maintains articulating valve 52 in a non-flow position, with articulating motor 26 acting as a rigid link for maintaining front and rear frame portions 16 and 18 in a rigid, straight-ahead orientation. In this mode of steering control, the first and second rotary sensors 54 and 62 are in a non-operative mode, with conventional steering effected by selective operation of steering input hand pump 46 by steering wheel 48. Pressurized hydraulic fluid is thus selectively ported to steering hydraulic motor 30 which operates through the Ackerman steering linkage for steering front wheels 24. As noted, steering in this manner is desirable for transport of the implement 10 at relatively high speed, and for operation of the implement over uneven terrain.

Referring now to FIG. 4, implement 10 is illustrated as being maneuvered by articulated steering only. For this mode of steering control, steerable front wheels 24 are maintained in their straight-ahead disposition by non-operation of steering hydraulic motor 30. The operator of the implement effects articulated steering by selective manipulation of rocker switch 68, which operates through control module 64 to selectively position the valve spool of articulating valve 52. Thus, the control of pressurized hydraulic fluid from hydraulic pump 40 via conduit 50 to articulating motor 26 is selectively controlled by valve 52.

FIG. 5 illustrates combined or coordinated conventional and articulated steering of implement 10. For this mode of operation, mode switch 66 is selectively positioned so as to join first and second rotary sensors 54 and 62 in operative association with each other. The control module 64 in turn selectively operates articulating valve 52 for operation of articulating motor 26. Steering input by the operator is effected via hand pump 46 which provides pressurized hydraulic fluid to steering hydraulic motor 30. The control module 64 acts to maintain comparable values for the first and second signals produced by the first and second rotary sensors 52 and 64 by operation of articulating valve 52. Thus, as front wheels 24 are steered, coordinated articulated steering movement of the implement frame is correspondingly effected for steering the implement in the same direction as the direction of steering movement of the front wheels.

As will be recognized, the coordinated steering mode provided by the present system greatly enchances the versatility of the implement 10. Combined steering in this manner provides superior maneuverability for the implement, such as for use in stockpiling, truck loading, and for operation in confined areas. Because of the greatly enhanced maneuverability for the implement achieved with combined steering, less backing, braking, shifting, and turning of the implement is required, thus enhancing the efficiency with which work operations are performed. Because of the enhanced maneuverability, operator fatigue is reduced, thus further promoting efficient material handling operations.

FIGS. 6 and 7 illustrate operation of the present steering system in a so-called "semi-crab" mode. This mode of operation particularly enhances the efficiency of implement 10 for certain types of work operations. This mode of steering control is similar to conventional front wheel steering only, except that front and rear frame portions 16 and 18 are first articulated and then held at a selected angle. Articulation of the frame portions is first effected by use of either rocker switch 68, or by first operating the implement in its combined steering mode so that its frame is articulated, and thereafter switching off the electrical control network.

Operation in the semi-crab mode is particularly desirable such as for backfilling a trench, designated T, with "spoil" designated S, as shown in FIG. 6. This mode of steering control desirably provides a manner in which the trench can be continuously backfilled while driving parallel to the trench. This orientation desirably shifts the relatively heavy rear portion of the implement away from the trench to reduce the possibility of the implement "sinking in". Although the amount of steering that can be effected by front wheels 24 in a direction away from the trench is relatively limited in this mode of control, the side thrust component which is developed on blade 12 generally requires steering movements of wheels 24 toward the trench. Additional steering control can also be achieved by selective raising and lowering of the blade 12, as well as by use of the rear turning brakes typically operatively associated with the rear wheels 22.

FIG. 7 further illustrates operation of implement 10 in its semi-crab mode. Operation in this manner can be particularly desirable during use of attachments such as trencher R or cable plow P which are mounted off-center with respect to the longitudinal centerline of the implement since excessive side drafts on such attachments is abated. Operation in this mode of steering control can also be desirable for operation on grass or like terrain which is subject to damage since the front and rear wheels of the implement do not move through the same tracks on the ground.

Referring now to FIG. 8, an alternate embodiment of the present steering system is disclosed. This embodiment of the system is also configured to provide the same multi-mode operation as previously described. However, this embodiment is configured to permit selective articulation of the implement frame via steering wheel 48, and thus does not include a rocker switch 68 or the like for effecting independent articulation.

The embodiment of FIG. 8 is similar to the embodiment shown in FIG. 2 in most respects, but includes a hydraulic selector valve 170 hydraulically joined with steering hand pump 46, as well as with articulating motor 26 and steering motor 30. Selector valve 170 is electrically joined with a modified control module 164 of the system's control network, with selective steering mode control provided via mode switch 166 at the operator's control area. During either conventional or combined conventional/articulated steering, mode switch 166 is suitably positioned so that pressurized hydraulic fluid from steering hand pump 46 is selectively directed to steering hydraulic motor 30 (during combined steering, pressurized fluid to articulating motor 26 is still provided via articulating valve 52). However, when it is desired to effect articulated steering only, the mode switch 166 is positioned so as to hydraulically join the hand pump 46 with the articulating motor 26 via hydraulic fluid conduits teed to conduits 28. Thus, articulated steering of the implement is effected in a conventional manner by selective manipulation of steering wheel 48.

The greatly enhanced versatility provided by the present multi-mode steering system will be readily appreciated. It should be additionally noted that the configuration of the system is relatively straightforward, and desirably lends itself to modification of existing steering systems.

From the foregoing, it will be observed that numerous modifications and variations of the present invention can be effected without departing from the true spirit and scope of the novel concept of the present invention. It will be understood that no limitation with respect to the specific embodiments illustrated herein is intended or should be inferred. It is, of course, intended to cover by the appended claims all such modifications as fall within the scope of the claims.

What is claimed:

1. A material handling implement having a multi-mode steering system, comprising:

a steerable, articulable frame having a front portion and a rear portion, said frame including articulating means pivotally connecting said front and rear frame portions for movement with respect to each other;

a pair of rear wheels mounted on respective opposite sides of said rear frame portion;

a pair of steerable front wheels mounted on respective opposite sides of said front frame portion, each of said front wheels being mounted for steering movement about a respective generally vertical axis through different first and second angles from a straight-ahead disposition with respect to said front frame portion;

steering linkage means operatively connecting said front wheels for steering said front wheels in unison;

first articulating hydraulic motor means operatively connected to and extending between said front and rear frame portions so that selective fluid pressurization of said first motor means articulates said frame;

second steering hydraulic motor means operatively connected with said steering linkage means so that selective fluid pressurization of said second motor means steers said front wheels;

first sensor means operatively connected with said front and rear frame portions for producing a first signal corresponding to the relative angular position of said front and rear frame portions, said first sensor means being operatively connected with said frame portions such that said first signal differs in value attendant to the same degree of articulation of said frame portions in opposite directions from a straight-ahead disposition;

second sensor means operatively connected with said steering linkage means for producing a second signal corresponding to the angular position of said front wheels, said second sensor means being operatively connected with said steering linkage means at one of said front wheels so that said second signal differs in value attendant to steering moving of said one front wheel through said first and second angles; and steering control means operatively connected with said first and second sensor means for selectively coordinating operation of said first articulating motor means with operation of said second steering hydraulic motor means to provide a plurality of modes of steering control for said implement, whereby selective coordinated operation of said first articulating motor means attendant to operation of said second steering motor means results in equal, right-hand and left-hand angular articulation of said frame portions attendant to steering movement of said one front wheel through said differing first and second angles.

2. A material handling implement and steering system in accordance with claim 1, including hydraulic fluid pump means for providing a supply of pressurized hydraulic fluid for operation of said first and second hydraulic motor means, said steering control means including electrically-operable articulating valve means for selectively controlling the flow of pressurized hydraulic fluid to said first articulating motor means.

3. A material handling implement and steering system in accordance with claim 2, including steering input means for selectively directing pressurized fluid from said hydraulic pump means to said second steering hydraulic motor means for selectively steering said front wheels.

4. A material handling implement and steering system in accordance with claim 3, wherein said steering control means comprises mode switch means operable from a control area on said implement for selectively joining said first and second sensor means in operative association with each other whereby steering of said front wheels effects articulation of said frame by operation of said articulating valve means so that said frame is articulated for effecting steering in the same direction as the direction of steering effected by movement of said front wheels.

5. A material handling implement and steering system in accordance with claim 4, wherein said steering control means further includes articulating switch means operable from said control area for selectively operating said articulating valve means independently of said front wheels.

6. A material handling implement and steering system in accordance with claim 4, including hydraulic selector valve means hydraulically joined to said first and second hydraulic motor means and said steering input means, said selector valve means being operatively connected to said control means whereby said mode switch means can be selectively positioned to operate said selector valve means to join said steering input means with either one of said first and second hydraulic motor means.

7. A material handling implement and steering system in accordance with claim 1, including selectively adjustable linkage means operatively connecting said first sensor means with said frame portions whereby the degree of articulation of said frame portions corresponding to a given value of said first signal can be selectively varied.

8. A multi-mode steering system for an implement having a steerable, articulable wheeled frame including pivotally connected front and rear frame portions, and including a pair of steerable front wheels mounted on respective opposite sides of said front frame portion for concurrent steering movement about respective generally vertical axes, said steering system comprising:

first articulating hydraulic motor means operatively connected to and extending between said front and rear frame portions so that selective fluid pressurization of said first motor means articulates said frame;

second steering hydraulic motor means operatively connected to said front wheels so that selective fluid pressurization of said second motor means steers said front wheels;

first rotational sensor means operatively connected with said front and rear frame portions for producing a first signal corresponding to the relative angular position of said front and rear frame portions, said first sensor means being adapted to produce differing values of said first signal attendant the same degree of articulation of said frame portions in opposite directions from a straight-ahead orientation;

second rotational sensor means operatively connected with one of said front wheels for producing a second signal corresponding to the angular position of said one front wheel, said one front wheel being steerable through first and second differing angles from a straight-ahead position relative to said front frame portion; and steering control means operatively connected with said first and second sensor means for selectively coordinating operation of said first articulating motor means with operation of said second steering hydraulic motor means whereby said frame is corresponding articulated in opposite directions from a straight-ahead disposition through equal degrees of articulation attendant to steering movement of said one front wheel through said differing first and second angles, said steering control means being configured to maintain comparable values of said first and second signals during selective coordinated operation of said first articulating motor means.

9. A multi-mode steering system in accordance with claim 8, wherein said steering control means includes electrically operable and articulating valve means for selectively controlling the flow of pressurized hydraulic fluid to said first articulating motor means, said system including steering input means for selectively controlling the flow of pressurized hydraulic fluid to said second steering motor means.

10. A multi-mode steering system in accordance with claim 9, wherein said steering control means includes mode switch means for selectively joining said first and second sensor means in operative association with each other whereby steering of said front wheels effects articulation of said frame by operation of said articulating valve means so that said frame is articulated for effecting steering in the same direction as the direction of steering effected by movement of said front wheels.

11. A multi-mode steering system in accordance with claim 9, wherein said steering control means further includes articulating switch means for selectively operating said articulating valve means independently of said front wheels.

12. A multi-mode steering system in accordance with claim 9, including hydraulic selector valve means hydraulically joined to said first and second hydraulic motor means and said steering input means, said selector valve means being operatively connected to said steering control means whereby said mode switch means can be selectively positioned to operate said selector valve means to join said steering input means with either one of said first and second hydraulic motor means.

* * * * *